United States Patent
Osaka

(10) Patent No.: US 8,212,539 B2
(45) Date of Patent: Jul. 3, 2012

(54) INTERLEAVED CONVERTER

(75) Inventor: Shohei Osaka, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 336 days.

(21) Appl. No.: 12/713,873

(22) Filed: Feb. 26, 2010

(65) Prior Publication Data

US 2010/0244789 A1 Sep. 30, 2010

(30) Foreign Application Priority Data

Mar. 24, 2009 (JP) ................ P2009-072446

(51) Int. Cl.
*G05F 1/00* (2006.01)

(52) U.S. Cl. .............. 323/272; 323/283; 323/222

(58) Field of Classification Search .......... 323/272, 323/222, 283
See application file for complete search history.

(56) References Cited

U.S. PATENT DOCUMENTS 7,884,588 B2 * 2/2011 Adragna et al. ............. 323/272
8,125,203 B2 * 2/2012 Ayukawa et al. ............. 323/272

FOREIGN PATENT DOCUMENTS

| JP | 62-58871 | 3/1987 |
| JP | 63-186555 | 8/1988 |
| JP | 3480201 | 10/2003 |
| JP | 3570113 | 7/2004 |

* cited by examiner

*Primary Examiner* — Shawn Riley
(74) *Attorney, Agent, or Firm* — Oblon, Spivak, McClelland, Maier & Neustadt, L.L.P.

(57) ABSTRACT

The present invention includes: an input voltage detector detecting an input voltage of a parallel converter and outputting an input voltage signal; an output voltage detector detecting an output voltage of the parallel converter; and a controller. The controller includes an error amplifier comparing the output voltage signal and a reference voltage and outputting an error amplification signal; an arithmetic operator generating an ON time signal and an OFF time signal based on the input and output voltage signals and the error amplification signal; a phase signal generator generating plural phase signals having different phases based on the ON and OFF time signals and the error amplification signal; a pulse generator generating plural pulse-train signals synchronized with the respective phase signals based on the ON time signal, the error amplification signal and the phase signals; and a driver driving the switching units in accordance with the pulse-train signals.

6 Claims, 14 Drawing Sheets

INTERLEAVED CONVERTER

TECHNICAL FIELD

The present invention relates to an interleaved converter, and particularly, to a technique of a controller for the interleaved converter.

BACKGROUND ART

An interleaved converter is disclosed in, for example, Japanese Patent Application Publication Nos. Sho 62-58871 and Sho 63-186555 as well as Japanese Patent No. 3570113. The interleaved converter is an electric power conversion device in which multiple converters are connected in parallel and are phase-shifted from one another to reduce current ripples of the current inputted to the converter and the current to be outputted from the converter. In addition, a phase controller for an interleaved converter is disclosed in Japanese Patent Nos. 3570113 and 3480201.

FIG. 1 is a circuit configuration diagram showing a conventional interleaved converter using two circuits of boost converters.

In FIG. 1, a first series circuit, which includes a boost reactor L1, a switching element Q1 made of a MOSFET, and a switching current detector CT1, is connected to the terminals of an input power source Vin formed of a DC power source. The anode of a rectifier D1 is connected to a connection point of the reactor L1 and the switching element Q1 while the cathode of the rectifier D1 is grounded through a smoothing capacitor Co.

A second series circuit, which includes a boost reactor L2, a switching element Q2 made of a MOSFET, and a switching current detector CT2, is connected to the terminals of the input power source Vin. The anode of a rectifier D2 is connected to a connection point of the boost reactor L2 and the switching element Q2 while the cathode of the rectifier D2 is grounded through the smoothing capacitor Co.

A voltage detector 20 is configured to receive an output voltage Vo outputted from the terminals of the smoothing capacitor Co, and output an output voltage signal VFB. A first control circuit 21 is configured to generate an output signal Vdr1 based on an output from the switching current detector CT1 and the output voltage signal VFB, and thereby perform on/off control of the gate of the switching element Q1 by using the output signal Vdr1. A charge/discharge device 23 is configured to receive the output signal Vdr1 from the first control circuit 21. A phase control capacitor C21 is connected to one of output terminals of the charge/discharge device 23 and a phase control capacitor C22 is connected to the other one of the output terminals of the charge/discharge device 23.

A second control circuit 22 is configured to generate an output signal Vdr2 based on an output Vi2 from the switching current detector CT2, the output voltage signal VFB, as well as outputs Vc1 and Vc2 of the phase control capacitors C21 and C22, and thereby perform on/off control of the gate of the switching element Q2 by using the output signal Vdr2.

The boost reactor L1, the switching element Q1, the switching current detector CT1, the rectifier D1, and the first control circuit 21 form a first converter. The boost reactor L2, the switching element Q2, the switching current detector CT2, the rectifier D2, and the second control circuit 22 form a second converter. The first converter and the second converter are connected to each other at the respective input terminals as well as at the respective output terminals, thereby forming a boost interleaved converter.

The boost converter is configured to output an output voltage Vo that is higher than an input voltage Vin in accordance with the ON/OFF operations of the switching elements Q1 and Q2. When the switching element Q1 (or Q2) is ON, current flows from Vin, through L1 (or L2) and then Q1 (or Q2), to Vin, so that an energy of the magnetic flux is accumulated in the boost reactor L1 (or L2). When the switching element Q1 (or Q2) is OFF, current flows from Vin through L1 (or L2), D1 (or D2), and Co, to Vin, so that the energy of the magnetic flux in the boost reactor L1 (or L2), which is accumulated during the ON time of the switching element Q1 (or Q2), is discharged. This operation is expressed by the following expression:

$$\Delta IL = \left| \frac{Vin}{L} \cdot Ton \right| \leq \left| \frac{Vo + VF - Vin}{L} \cdot Toff \right|. \quad \text{A(1)}$$

In the expression (1), $\Delta IL$ represents an amount of change in current flowing through the boost reactor L1 (or L2), Vin the voltage across the input power source Vin, Vo the voltage across the smoothing capacitor Co, VF the forward drop voltage of the rectifier D1 (or D2), L the value of the inductance of the boost reactor L1 (or L2), Ton the ON time of the switching element Q1 (or Q2), and Toff the OFF time of the switching element Q1 (or Q2). The minimum value of the OFF time Toff of the switching element Q1 (or Q2) is obtained from the expression (2) using the input voltage Vin, the output voltage Vo, and the ON time Ton:

$$Toff \geq \frac{Vin}{Vo + VF - Vin} \cdot Ton. \quad \text{A(2)}$$

FIG. 2 is a chart showing the operation waveforms of components of the conventional interleaved converter. In FIG. 2, Vdr1 represents the drive signal of the switching element Q1, Vc21 and Vc22 the voltages across the phase control capacitors C21 and C22, respectively, Vdr2 the drive signal of the switching element Q2, Vi1 the output signal of the switching current detector CT1, Vi2 the output signal of the switching current detector CT2, Ii1 the current flowing through the reactor L1, Ii2 the current flowing through the reactor L2, Ii the input current of the interleaved converter, Id1 the current flowing through the rectifier D1, Id2 the current flowing through the rectifier D2, and Io the output current of the interleaved converter.

The first converter outputs the drive signal Vdr1 for driving the switching element Q1, based on the output signal VFB of the voltage detector 20 and the output signal Vi1 of the switching current detector CT1, thereby converting the voltage from the input voltage Vin to the output voltage Vo. When the switching element Q1 is turned ON, the input voltage Vin is applied to the boost reactor L1, so that an energy of the magnetic flux is accumulated in the boost reactor L1. When the switching element Q1 is turned OFF, the energy of the magnetic flux accumulated in the boost reactor L1 is charged to the smoothing capacitor Co through the rectifier D1.

In this manner, the first converter performs the power conversion through the path from the input power source Vin to the smoothing capacitor Co by use of the ON/OFF operations of the switching element Q1. In the same manner, the second converter performs the power conversion through the path from the input power source Vin to the smoothing capacitor Co by use of the ON/OFF operations of the switching element Q2. Operating the first converter and the second converter respectively with mutually different phases suppresses the ripple of the current flowing through the input power source Vin and the smoothing capacitor Co. The suppressing effect is proportional to the number of converters connected in parallel with a constant phase difference between each two of the converters.

In the conventional example shown in FIG. 1, the charge/discharge device 23 is provided to appropriately control the phase of each converter. The charge/discharge device 23 is configured to perform the charging and discharging of the phase control capacitors C21 and C22 in synchronization with the drive signal Vdr1 of the switching element Q1. When the phase control capacitor C21 is charged, the phase control capacitor C22 is discharged. When the phase control capacitor C21 is discharged, the phase control capacitor C22 is charged. The voltages Vc21 and Vc22 respectively across the phase control capacitors C21 and C22 form triangular waves having phases mutually shifted by 180 degrees. From the comparison of signals of the two triangular waves having phases mutually shifted, it is found that the values of the voltages Vc21 and Vc22 cross each other at the middle of each cycle of the drive signal Vdr1 of the switching element Q1. The second control circuit 22 compares the inputted voltages Vc21 and Vc22 respectively across the phase control capacitors C21 and C22 with each other, thereby detecting a time point at which the voltages Vc21 and Vc22 cross each other, and outputs the drive signal Vdr2 to the switching element Q2 at the detected time point. With such a configuration, the second converter is given a voltage with a phase which is different by 180 degrees from that of the first converter.

However, in the interleaved converter configured as described above, the phase difference between the first and second converters varies due to a difference in capacity between the phase control capacitors C21 and C22. In addition, the interleaved converter requires phase control capacitors the number of which is equal to or larger than the number of converters connected in parallel. For this reason, an increase in the number of converters makes the circuit of the interleaved converter complicated.

An object of the present invention is thus to provide an inexpensive interleaved converter having a simplified circuit.

SUMMARY OF INVENTION

A first aspect of the present invention provides an interleaved converter including: a parallel converter including a plurality of converters connected in parallel, each of the plurality of converters including a reactor, a switching unit, and a rectifier; an input power source configured to supply power to the parallel converter; a smoothing capacitor configured to smooth an output of the parallel converter; an input voltage detector configured to detect an input voltage of the parallel converter, and thereby to output an input voltage signal; an output voltage detector configured to detect an output voltage of the parallel converter, and thereby to output an output voltage signal; and a controller configured to control the parallel converter. In the interleaved converter, the controller includes: an error amplifier configured to compare the output voltage signal with a reference voltage, and thereby to output an error amplification signal; an arithmetic operator configured to perform arithmetic processing based on the input voltage signal, the output voltage signal, and the error amplification signal, and thereby to generate an ON time signal and an OFF time signal; a phase signal generator configured to generate a plurality of phase signals having mutually different phases, based on the ON time signal, the OFF time signal, and the error amplification signal; a pulse generator configured to generate a plurality of pulse-train signals synchronized respectively with the plurality of phase signals, based on the ON time signal, the error amplification signal, and the plurality of phase signals; and a driver configured to drive the switching units in accordance with the plurality of pulse-train signals.

In addition, a second aspect of the present invention provides an interleaved converter including: a parallel converter including a plurality of converters connected in parallel, each of the plurality of converters including a reactor, a switching unit, and a rectifier; an input power source configured to supply power to the parallel converter; a smoothing capacitor configured to smooth an output of the parallel converter; an input voltage detector configured to detect an input voltage of the parallel converter, and thereby to output an input voltage signal; an output voltage detector configured to detect an output voltage of the parallel converter, and thereby to output an output voltage signal; and a controller configured to control the parallel converter. In the interleaved converter, the controller includes: an error amplifier configured to compare the output voltage signal with a reference voltage, and thereby to output an error amplification signal; an arithmetic operator configured to perform arithmetic processing based on the input voltage signal, the output voltage signal, and the error amplification signal, and thereby to generate an ON time signal and an OFF time signal; a phase signal generator configured to generate a plurality of phase signals having mutually different phases, based on the ON time signal and the OFF time signal;

a pulse generator configured to generate a plurality of pulse-train signals synchronized respectively with the plurality of phase signals, based on the ON time signal and the plurality of phase signals; and a driver configured to drive the switching units in accordance with the plurality of pulse-train signals.

DESCRIPTION OF EMBODIMENTS

Hereinafter, an interleaved converter according to an embodiment of the present invention will be described in detail with reference to the accompanying drawings. This interleaved converter is configured to improve the power factor of power inputted from an input power source.

Embodiment 1

Figure 1:
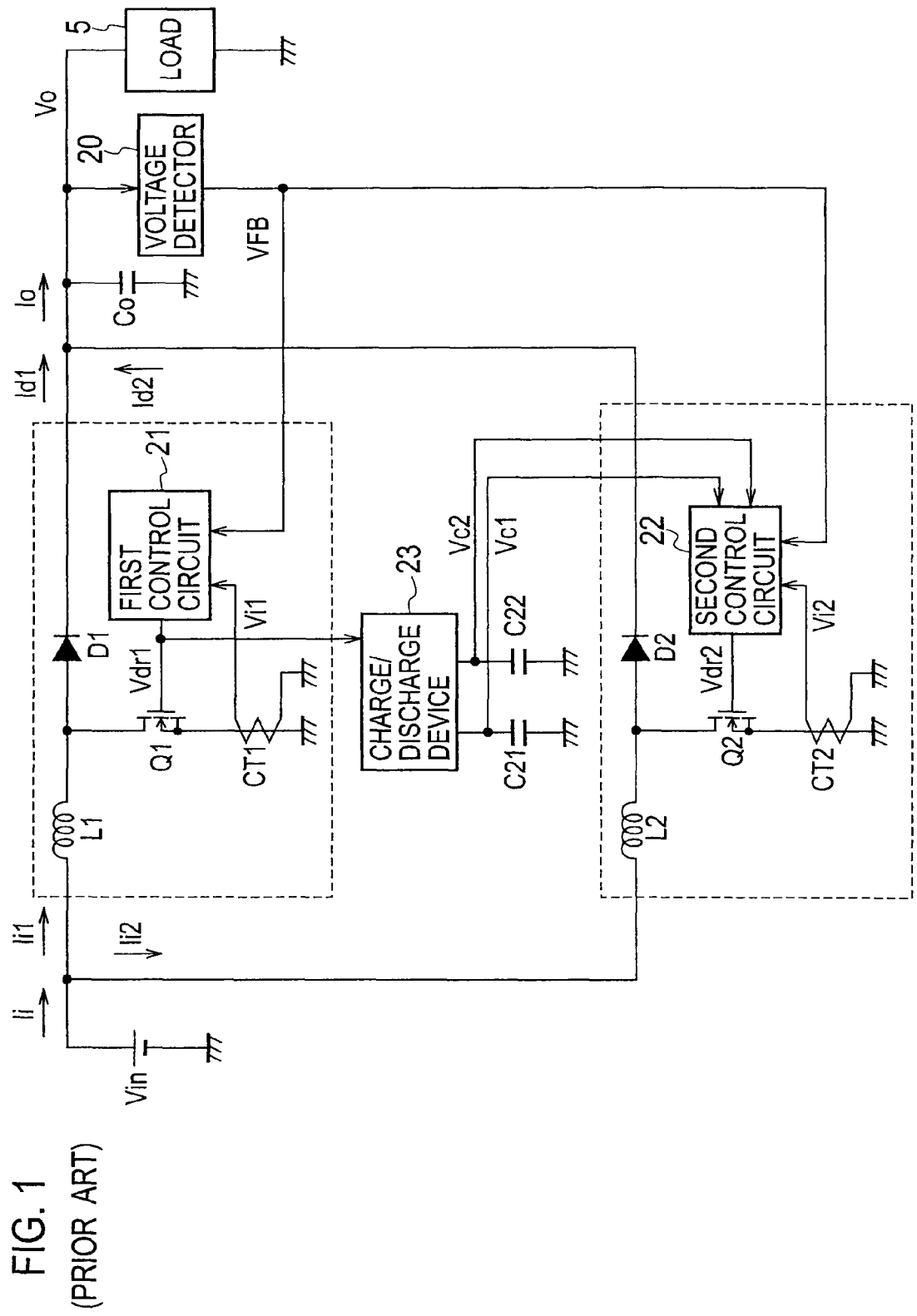
FIG. 1 is a circuit configuration diagram showing an example of a conventional interleaved converter.
Figure 2:
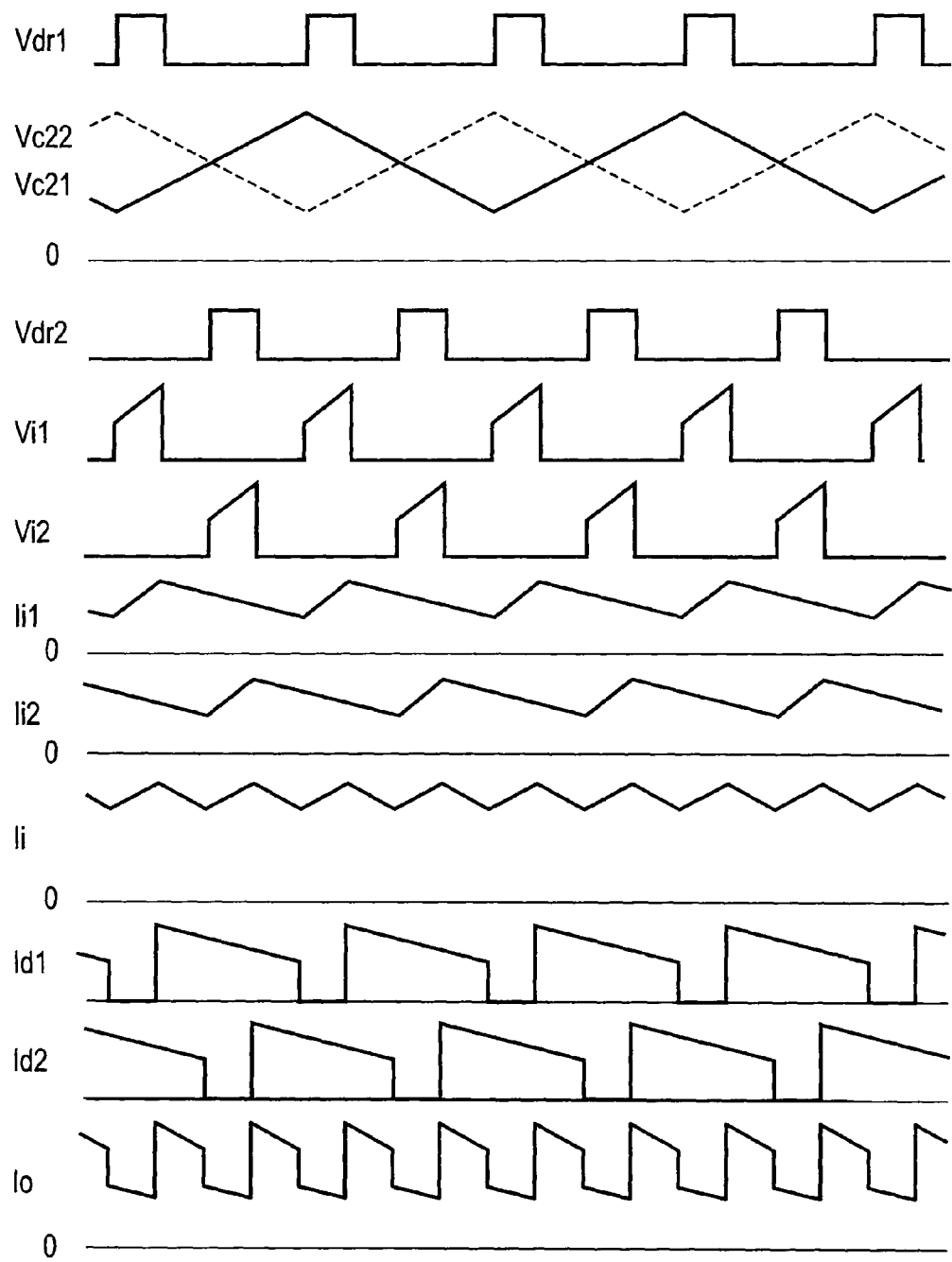
FIG. 2 is a chart showing the operation waveforms of components of the conventional interleaved converter.
Figure 3:
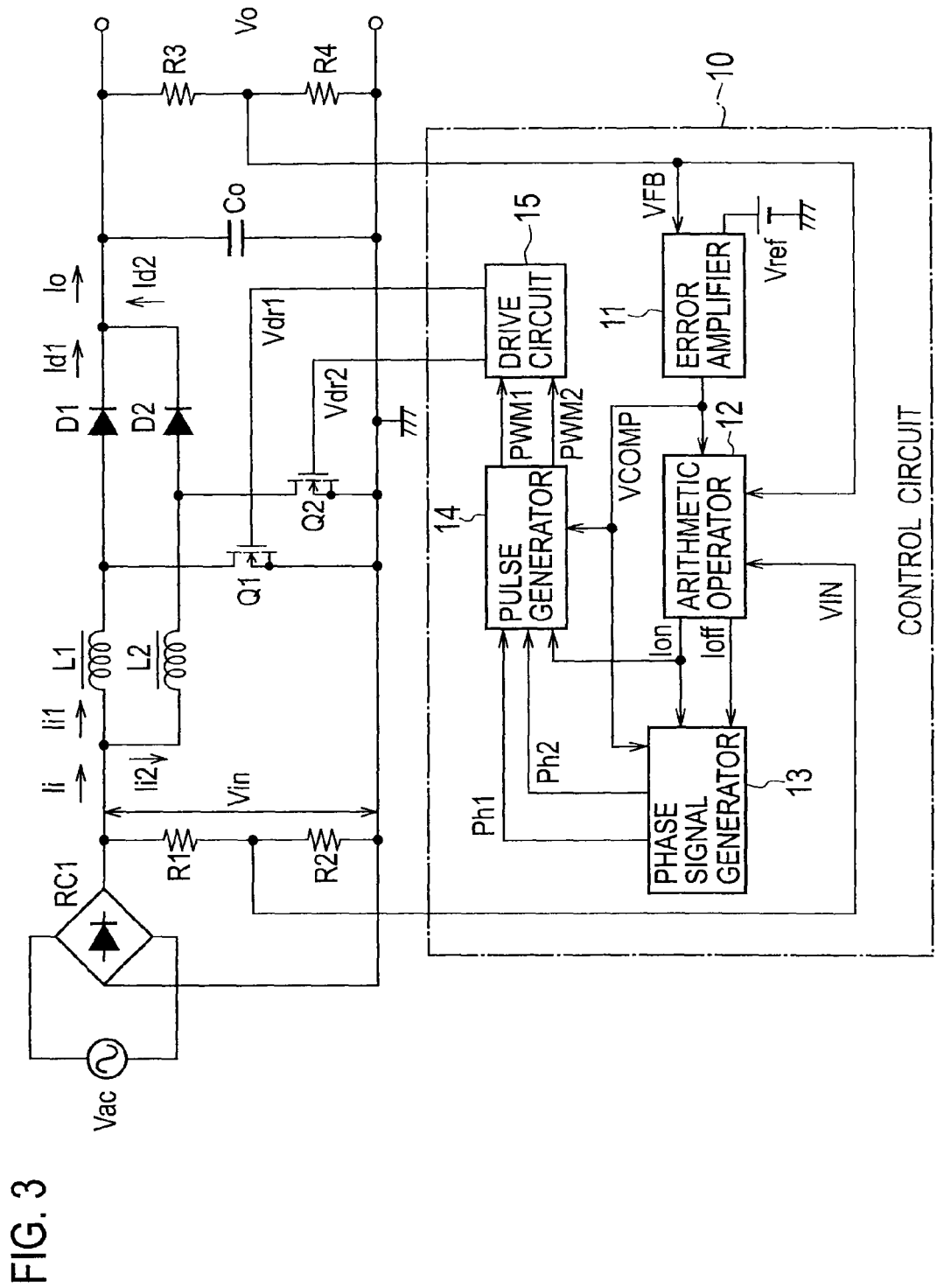
FIG. 3 is a circuit configuration diagram showing an interleaved converter according to Embodiment 1 of the present invention.

FIG. 3 is a circuit configuration diagram showing an interleaved converter according to Embodiment 1 of the present invention. A full-wave rectifier RC1 is configured to receive an AC voltage from an AC power source Vac, full-wave rectify the received AC voltage, and thereby output a DC voltage Vin. A first series circuit, which includes a boost reactor L1 and a switching element Q1 made of a MOSFET, is connected to the output terminal of the full-wave rectifier RC1. The anode of a rectifier D1 is connected to a connection point of the boost reactor L1 and the switching element Q1, and the cathode of the rectifier D1 is grounded through a smoothing capacitor Co.

A second series circuit, which includes a boost reactor L2 and a switching element Q2 made of a MOSFET, is connected to the output terminal of the full-wave rectifier RC1. The anode of a rectifier D2 is connected to a connection point of the boost reactor L2 and the switching element Q2, and the cathode of the rectifier D2 is grounded through the smoothing capacitor Co.

A first voltage divider resistor including a resistor R1 and a resistor R2 is connected to the output terminal of the full-wave rectifier RC1. A second voltage divider resistor including a resistor R3 and a resistor R4 is connected to both terminals of the smoothing capacitor Co.

A control circuit 10 is configured to receive a midpoint voltage VIN of the first voltage divider resistor and a midpoint voltage VFB of the second voltage divider resistor, and to then output drive signals to the gates of the respective switching elements Q1 and Q2. The control circuit 10 includes an error amplifier 11, an arithmetic operator 12, a phase signal generator 13, a pulse generator 14, and a drive circuit 15.

The error amplifier 11 is configured to amplify an error between the midpoint voltage VFB of the second voltage divider resistor and a reference voltage Vref, and to thereby output an error amplification signal VCOMP. The arithmetic operator 12 is configured to receive the midpoint voltage VIN of the first voltage divider resistor, the midpoint voltage VFB of the second voltage divider resistor, and the error amplification signal VCOMP, to perform arithmetic operation on these voltages, and to thereby output an ON time signal Ion and an OFF time signal Ioff. The ON time signal Ion is a signal proportional to the ON time of the switching element Q1 (or Q2), and the OFF time signal Ioff is a signal proportional to the OFF time of the switching element Q1 (or Q2).

The phase signal generator 13 is configured to generate and output a phase signal Ph1 and a phase signal Ph2 having mutually different phases, based on the ON time signal Ion, the OFF time signal Ioff, and the error amplification signal VCOMP. The pulse generator 14 is configured to generate and output a pulse-train signal PWM1 and a pulse-train signal PWM2 having the same duty ratio and mutually different phases, based on the phase signal Ph1, the phase signal Ph2, the ON time signal Ion, and the error amplification signal VCOMP. The drive circuit 15 is configured to generate a first drive signal Vdr1 for driving the switching element Q1 and a second drive signal Vdr2 for driving the switching element Q2, based on the pulse-train signals PWM1 and PWM2, and to output the first drive signal Vdr1 and the second drive signal Vdr2 to the corresponding switching elements.

The boost reactor L1, the switching element Q1, and the rectifier D1 form a first converter. The boost reactor L2, the switching element Q2, and the rectifier D2 form a second converter. The first converter and the second converter are connected to each other at the respective input terminals as well as at the respective output terminals, thereby forming an interleaved converter.

The interleaved converter according to Embodiment 1 is configured to perform a power-factor improving operation to improve the power factor of an AC input current Iac inputted from an AC input power source Vac. The improving of the power factor requires for an input current to change in proportion to an input voltage. The state of the input current (IL·Vin) during the power-factor improvement being performed are expressed by the following expressions (3) and (4) obtained by modifying the expression (1):

$$IL \cdot Vin = \frac{Vin}{L} \cdot Ton = \frac{Vo + VF - Vin}{L} \cdot Toff; \quad (3)$$

$$IL = \frac{1}{L} \cdot Ton = \frac{Vo + VF - Vin}{Vin} \cdot \frac{1}{L} \cdot Toff. \quad (4)$$

The ON time of a switching element changes in accordance with power regardless of the phase of the input voltage. The OFF time of the switching element can be obtained using the input voltage, the output voltage, and the ON time of the switching element.

When the ON time signal Ton and the OFF time signal Toff of the switching element are generated in accordance with a constant current charge (or discharge) of a capacitor, the following expressions (5) and (6) are obtained:

$$Ton = \frac{Cosc \cdot VCOMP}{Ion}; \quad (5)$$

$$Toff = \frac{Cosc \cdot VCOMP}{Ioff}. \quad (6)$$

In the expressions (5) and (6), Cosc represents an oscillator capacitor, VCOMP the error amplification signal, Ion the ON time signal, Ioff the OFF time signal. Since the ON time signal Ton of the switching element varies due to the error amplification signal VCOMP, the ON time signal Ion is a constant or a function of the error amplification signal VCOMP. When the OFF time signal Ioff is obtained by substituting the expressions (5) and (6) into the expression (2), the following expression (7) is obtained:

$$Ioff = Ion \frac{Vo + VF - Vin}{Vin}. \qquad A(7)$$

To put it differently, the OFF time signal Ioff is a value obtained by multiplying the ON time signal Ion by a value obtained by dividing a difference between the output voltage Vo and the input voltage Vin by the input voltage Vin.

Figure 4:
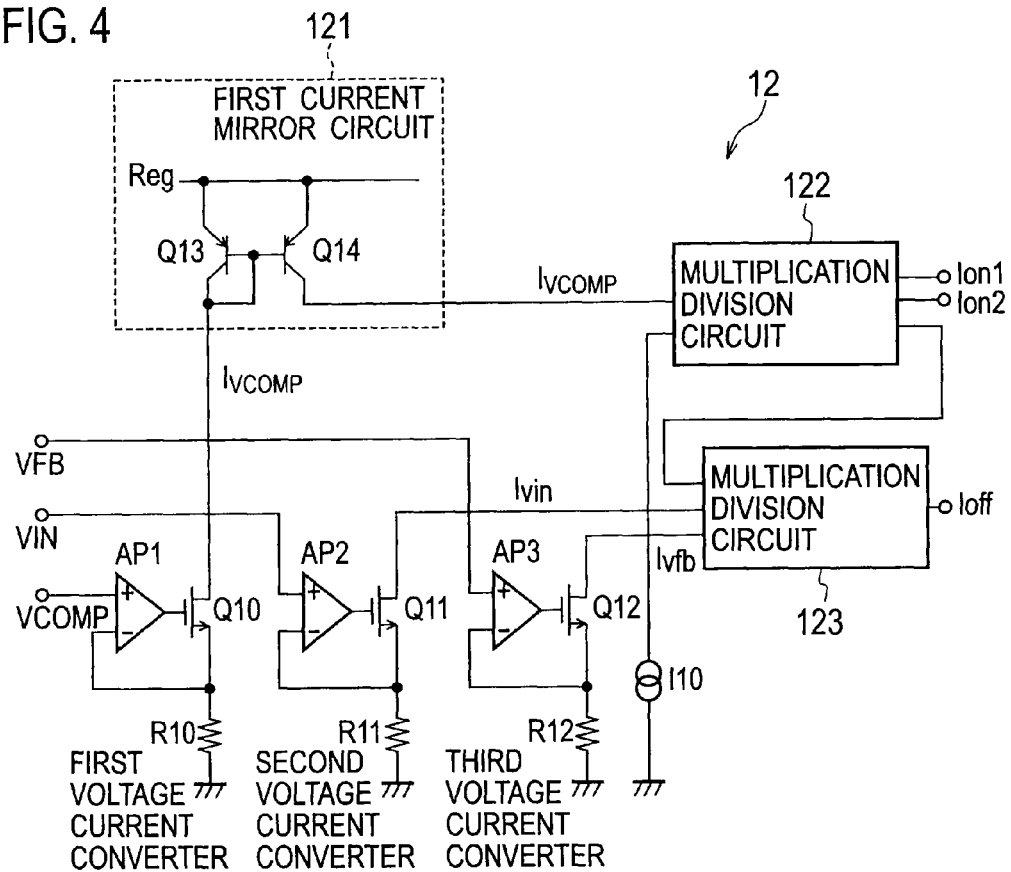
FIG. 4 is a circuit configuration diagram showing an arithmetic operator provided in the interleaved converter according to Embodiment 1.

FIG. 4 is a circuit configuration diagram showing the arithmetic operator 12 provided in the interleaved converter according to Embodiment 1 of the present invention. In FIG. 4, an operational amplifier AP1 has a non-inverting input terminal connected to the error amplification signal VCOMP, an output terminal connected to the gate of a MOSFET Q10, and an inverting input terminal grounded through a resistor R10 and connected to the source of the MOSFET Q10. A current signal Ivcomp proportional to the error amplification signal VCOMP is outputted from the drain of the MOSFET Q10 to a multiplication and division circuit 122 through a first current mirror circuit 121. The operational amplifier AP1 and the MOSFET Q10 form a first voltage/current converter circuit.

An operational amplifier AP2 has a non-inverting input terminal connected to the midpoint voltage VIN of the first voltage divider resistor, an output terminal connected to the gate of a MOSFET Q11, and an inverting input terminal grounded through a resistor R11 and connected to the source of the MOSFET Q11. A current signal Ivin proportional to the midpoint voltage VIN of the first voltage divider resistor is outputted from the drain of the MOSFET Q11 to a multiplication and division circuit 123. The operational amplifier AP2 and the MOSFET Q11 form a second voltage/current converter circuit.

An operational amplifier AP3 has a non-inverting input terminal connected to the midpoint voltage VFB of the second voltage divider resistor, an output terminal connected to the gate of a MOSFET Q12, and an inverting input terminal grounded through a resistor R12 and connected to the source of the MOSFET Q12. A current signal Ivfb proportional to the midpoint voltage VFB of the second voltage divider resistor is outputted from the drain of the MOSFET Q12 to the multiplication and division circuit 123. The operational amplifier AP3 and the MOSFET Q12 form a third voltage/current converter circuit.

In the first current mirror circuit 121, the collector and the base of a transistor Q13 as well as the base of a transistor Q14 are connected to form an input terminal of the first current mirror circuit 121. The emitters of the respective transistors Q13 and Q14 are connected to a power source Reg. The collector of the transistor Q14 forms an output terminal of the first current mirror circuit 121. The multiplication and division circuit 122 is configured to perform multiplication and division operations based on a constant current I10 and the current signal Ivcomp inputted from the first current mirror circuit 121 and being proportional to the error amplification signal VCOMP, and to then output the ON time signal Ion as an output of the multiplication and division operations.

The multiplication and division circuit 123 is configured to perform multiplication and division operations based on the On time signal Ion from the multiplication and division circuit 122, the current signal Ivin proportional to the midpoint voltage VIN of the first voltage divider resistor, and the current signal Ivfb proportional to the midpoint voltage VFB of the second voltage divider resistor, and to then output t+he OFF time signal Ioff as an output of the multiplication and division operations.

Figure 5:
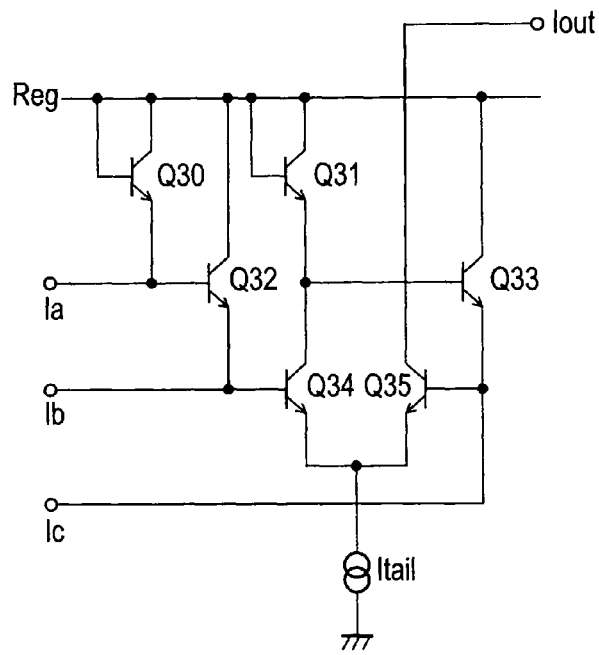
FIG. 5 is a circuit configuration diagram showing a multiplication and division circuit provided in the interleaved converter according to Embodiment 1.

FIG. 5 is a circuit configuration diagram showing each of the multiplication and division circuits 122 and 123 provided in the interleaved converter according to Embodiment 1. In FIG. 5, the base and the collector of a transistor Q30 are connected to the power source Reg, and the emitter of the transistor Q30 is connected to an Ia input terminal and the base of a transistor Q32. The collector of the transistor Q32 is connected to the power source Reg, and the emitter of the transistor Q32 is connected to an Ib input terminal and the base of a transistor Q34. The emitter of the transistor Q34 is connected to the emitter of a transistor Q35 and one end of a current source Itail.

The collector of the transistor Q34 is connected to the base of a transistor Q33 and the emitter of a transistor Q31. The base of the transistor Q35 is connected to an Ic input terminal and the emitter of the transistor Q33. The collector of the transistor Q35 is connected to an Iout output terminal. The collector of the transistor Q33 is connected to the power source Reg. The base and the collector of the transistor Q31 are connected to the power source Reg. The transistors Q30 to Q35 are NPN-type transistors, and form a multiplication and division circuit.

A value obtained by dividing a result of multiplication of an input current of the Ia input terminal and an input current of the Ib input terminal by an input current of the Ic input terminal is outputted to the Iout output terminal as a current signal. In addition, the maximum output of the Tout output terminal is limited to be less than the current source Itail.

Figure 6A:
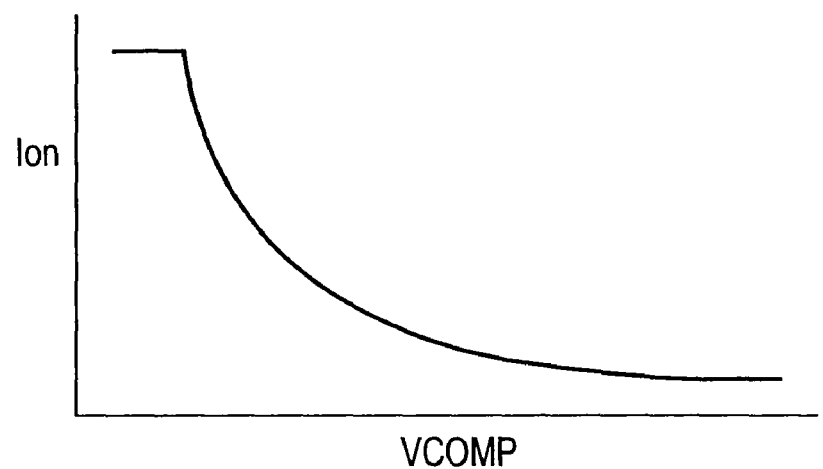
FIGS. 6A and 6B are graphs showing examples of waveforms indicating input/output characteristics of the arithmetic operator provided in the interleaved converter according to Embodiment 1.
Figure 6B:
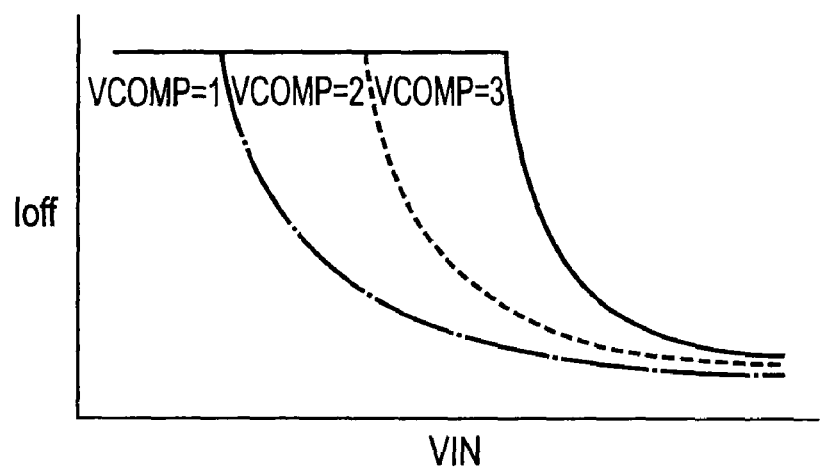

FIG. 6A and FIG. 6B are graphs showing examples of waveforms indicating the input/output characteristics of the arithmetic operator 12 provided in the interleaved converter according to Embodiment 1. FIG. 6A shows how the ON time signal Ion changes when the error amplification signal VCOMP is changed. The constant current I10 is inputted to the Ia input terminal and the Ib input terminal of the multiplication and division circuit 122, and the current signal Ivcomp is inputted to the Ic input terminal of the multiplication and division circuit 122. The expression for the configuration of the multiplication and division circuit 122 is (current source I10)×(current source I10)/(current signal Ivcomp). Accordingly, the ON time signal Ion has such a characteristic as to be inversely proportional to the error amplification signal VCOMP.

FIG. 6B shows how the OFF time signal Ioff changes when the midpoint voltage VIN of the first voltage divider resistor is changed with the midpoint voltage VFB of the second voltage divider resistor being maintained at a constant value. The ON time signal Ion and an input/output difference signal (Ivfb−Ivin) are inputted to the Ia input terminal and the Ib input terminal of the multiplication and division circuit 123. Here, the input/output difference signal (Ivfb−Ivin) is obtained by subtracting the current signal Ivin proportional to the midpoint voltage VIN of the first voltage divider resistor from the current signal Ivfb proportional to the midpoint voltage VFB of the second voltage divider resistor. The current signal Ivin proportional to the midpoint voltage VIN of the first voltage divider resistor is inputted to the Ic input terminal of the multiplication and division circuit 123.

The expression for the configuration of the multiplication and division circuit 123 is ON time signal Ion×input/output difference signal (Ivfb−Ivin)/(current signal Ivin proportional to the midpoint voltage VIN of the first voltage divider resistor). This expression is equivalent to that shown in the expression (7), so that the output of the multiplication and division circuit 123 becomes the OFF time signal Ioff.

Figure 7:
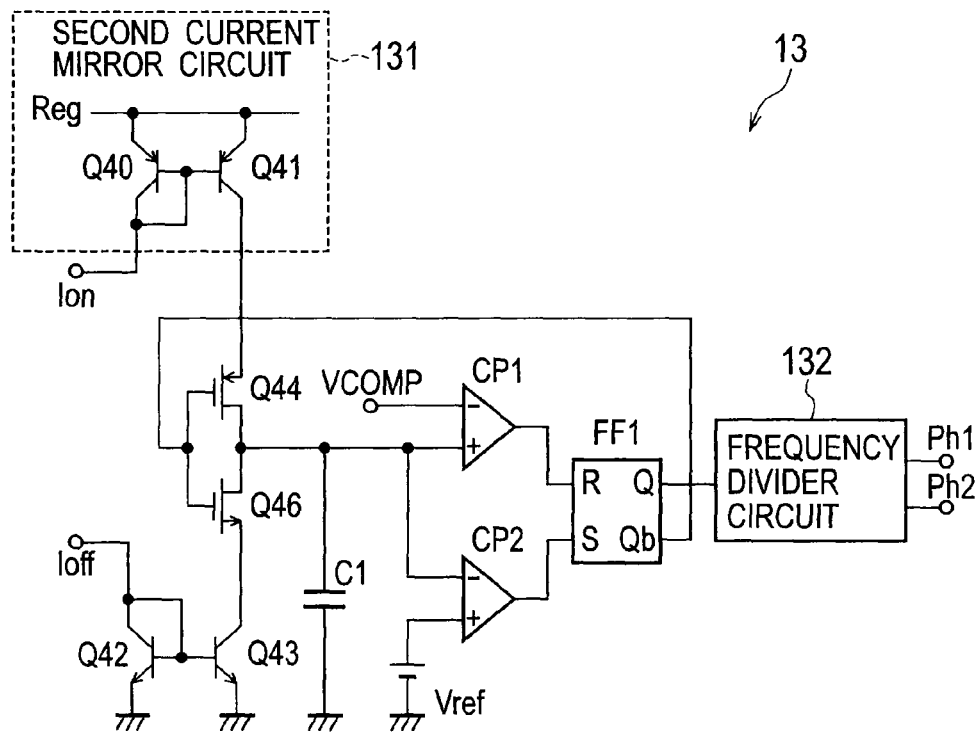
FIG. 7 is a circuit configuration diagram showing a phase signal generator provided in the interleaved converter according to Embodiment 1.

FIG. 7 is a circuit configuration diagram showing the phase signal generator 13 provided in the interleaved converter according to Embodiment 1. In FIG. 7, an Ion input terminal is connected to the base and the collector of a transistor Q40 as well as the base of a transistor Q41. The emitters of the transistors Q40 and Q41 are connected to the power source Reg. The collector of the transistor Q41 is connected to the source of a MOSFET Q44. The drain of the MOSFET Q44 is connected to the drain of a MOSFET Q46, one terminal of an oscillator capacitor C1, a non-inverting input terminal of a comparator CP1, and an inverting input terminal of a comparator CP2. The gate of the MOSFET Q44 is connected to the gate of the MOSFET Q46 and an inverted output Qb of an RS flip-flop FF1.

The source of the MOSFET Q46 is connected to the collector of a transistor Q43. The base of the transistor Q43 is connected to the base and the collector of a transistor Q42 as well as an Ioff input terminal. The emitters of the transistors Q42 and Q43 are grounded. The other terminal of the oscillator capacitor C1 is grounded.

An inverting input terminal of the comparator CP1 is connected to a terminal for the error amplification signal VCOMP. An output terminal of the comparator CP1 is connected to a reset terminal of the RS flip-flop FF1. A non-inverting input terminal of the comparator CP2 is connected to one terminal of a reference power source Vref. An output terminal of the comparator CP2 is connected to a set terminal of the RS flip-flop FF1.

An output Q of the RS flip-flop FF1 is connected to an input terminal of a frequency divider circuit 132. The phase signal Ph1 and the phase signal Ph2 are outputted from output terminals of the frequency divider circuit 132, respectively. The transistor Q40 and the transistor Q41 form a second current mirror circuit 131. The transistor Q42 and the transistor Q43 form a third current mirror circuit. The MOSFET Q44 and the MOSFET Q46 form a switching circuit.

Figure 8:
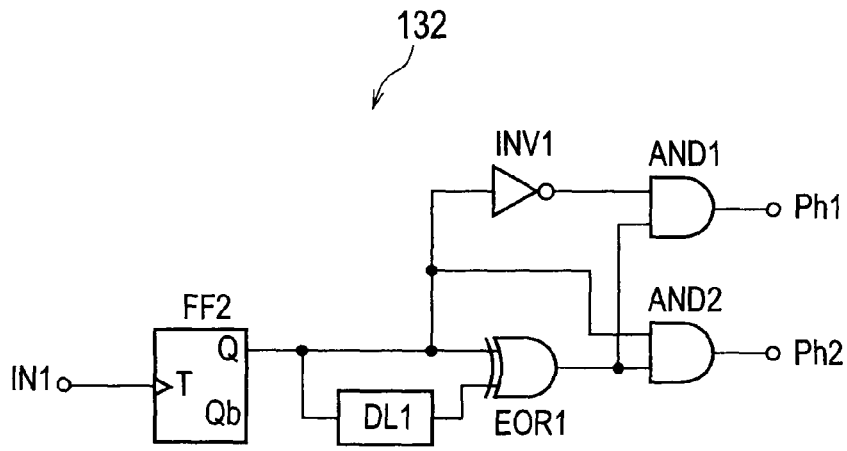
FIG. 8 is a circuit configuration diagram showing a frequency divider circuit in the phase signal generator shown in FIG. 7.

FIG. 8 is a circuit configuration diagram showing the frequency divider circuit 132 in the phase signal generator 13 shown in FIG. 7. In FIG. 8, an input terminal IN1 is connected to a T input of a T flip-flop FF2. An output Q of the T flip-flop FF2 is connected to an input terminal of an inverter INV1, one of input terminals of an AND circuit AND2, an input of a delay circuit DL1, and one of input terminals of an exclusive OR circuit EOR1. An output terminal of the inverter INV1 is connected to one of input terminals of an AND circuit AND1. An output terminal of the delay circuit DL1 is connected to the other one of the input terminals of the exclusive OR circuit EOR1. An output terminal of the exclusive OR circuit EOR1 is connected to the other one of the input terminals of the AND circuit AND2 and the other one of the input terminals of the AND circuit AND1. The first phase signal Ph1 is outputted from an output terminal of the AND circuit AND1, and the second phase signal Ph2 is outputted from an output terminal of the AND circuit AND2.

The T flip-flop FF2, the inverter INV1, the exclusive OR circuit EOR1, the delay circuit DL1, and the AND circuits AND1 and AND2 form a frequency divider circuit.

Figure 9:
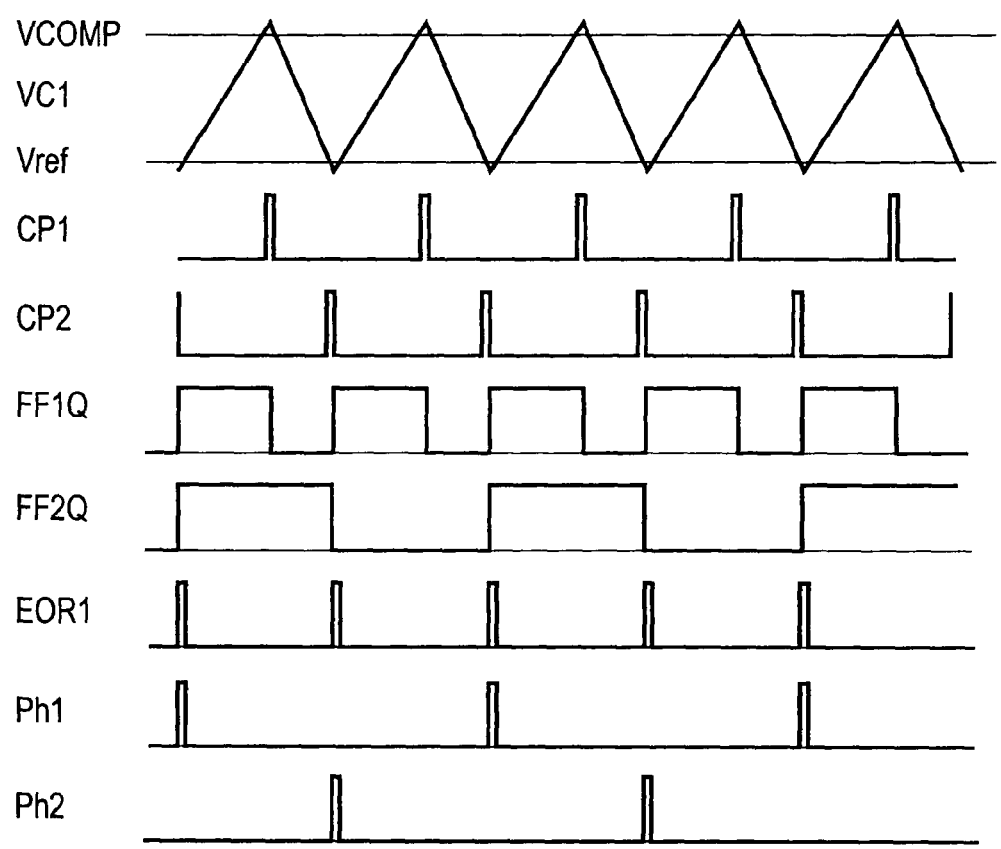
FIG. 9 is a chart showing the operation waveforms of components of the phase signal generator shown in FIG. 7.

FIG. 9 is a chart showing the operation waveforms of the respective components of the phase signal generator 13 shown in FIG. 7. In FIG. 9, VCOMP represents the output voltage of the error amplifier 11, Vc1 the voltage across the oscillator capacitor C1, Vref the output voltage of the reference power source Vref, CP1 the output signal of the comparator CP1, CP2 the output signal of the comparator CP2, FF1Q the output Q of the RS flip-flop FF1, FF2Q the output Q of the T flip-flop FF2, EOR1 the output of the exclusive OR circuit EOR1, Ph1 the first phase signal Ph1, which is the output of the AND circuit AND1, Ph2 the second phase signal Ph2, which is the output of the AND circuit AND2.

First of all, the ON time signal Ion and the OFF time signal Ioff generated by the arithmetic operator 12 are inputted to the phase signal generator 13. The ON time signal Ion and the OFF time signal Ioff thus inputted are sent to the oscillator capacitor C1 through the second current mirror circuit Q40 and Q41, the third current mirror circuit Q42 and Q43, and the switching circuit Q44 and Q46.

The switching circuit Q44 and Q46 switches, in accordance with the state of the RS flip-flop FF1, between the charging of the oscillator capacitor C1 according to the ON time signal Ion and the discharging of the oscillator capacitor C1 according to the OFF time signal Ioff.

When the RS flip-flop FF1 is in a set state, the inverted output Qb of the RS flip-flop FF1 is "L". At this time, the MOSFET Q44 of the switching circuit is in an ON state, and the MOSFET Q46 thereof is in an OFF state. Accordingly, the oscillator capacitor C1 is charged through the transistors Q40 and Q41 in accordance with the ON time signal Ion, so that the voltage Vc1 across the oscillator capacitor C1 increases. Once the voltage Vc1 across the oscillator capacitor C1 is charged to be equal to or higher than the error amplification signal VCOMP, the output of the comparator CP1 switches from "L" to "H", so that the RS flip-flop FF1 is reset.

When the RS flip-flop FF1 is reset, the inverted output Qb of the RS flip-flop FF1 is switched to "H". At this time, the MOSFET Q44 of the switching circuit is turned OFF, and the MOSFET Q46 thereof is turned ON. Accordingly, the electric charge accumulated in the oscillator capacitor C1 is discharged through the transistors Q42 and Q43 in accordance with the OFF time signal Ioff, so that the voltage Vc1 across the oscillator capacitor C1 decreases.

Once the voltage Vc1 across the oscillator capacitor C1 is discharged to be equal to or lower than the reference voltage Vref, the output of the comparator CP2 is switched from "L" to "H", so that the RS flip-flop FF1 is set again. The above-described operation is repeated to generate a pulse train, which is then inputted to the frequency divider circuit 132.

The pulse train inputted to the frequency divider circuit 132 is divided in frequency by 2 by the T flip-flop FF2. The signal thus divided by the T flip-flop FF2 becomes a pulse train having a duty ratio of approximately 50% of that of the original inputted pulse train if the frequency of the inputted pulse train does not change to a large extent. On the basis of the pulse train having a duty ratio of 50%, signals synchronized respectively with each rising edge and each falling edge are generated by the delay circuit DL1, the inverter INV1, the exclusive OR circuit EOR1, and the AND circuits AND1 and AND2, and are then outputted as the first phase signal Ph1 and the second phase signal Ph2, respectively.

The phase signal generator 13 shown in FIG. 7 generates phase signals for controlling two converters. For this reason, the ON time signal Ion and the OFF time signal Ioff are each doubled in frequency or the oscillator capacitor C1 is adjusted to have a half value so that the frequency of charge/discharge of the oscillator capacitor C1 should be twice the original oscillation frequency.

Figure 10:
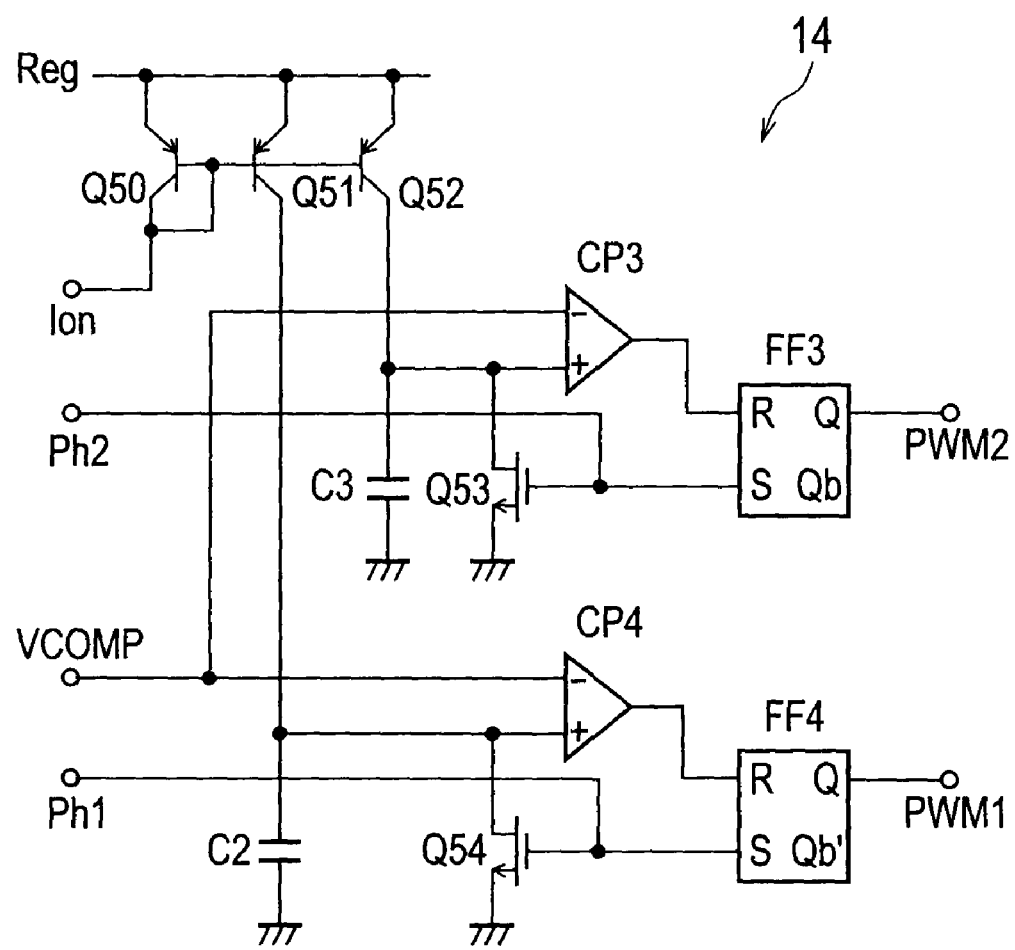
FIG. 10 is a circuit configuration diagram showing a pulse generator provided in the interleaved converter according to Embodiment 1.

FIG. 10 is a circuit configuration diagram showing the pulse generator 14 provided in the interleaved converter according to Embodiment 1. In FIG. 10, an input terminal for the ON time signal Ion is connected to the base and the collector of a transistor Q50, the base of a transistor Q51, and the base of a transistor Q52. The emitters of the transistors Q50, Q51, and Q52 are connected to the power source Reg.

The collector of the transistor Q51 is connected to one terminal of a first ON-time generator capacitor C2, the drain of a MOSFET Q54, and a non-inverting input terminal of a comparator CP4.

The collector of the transistor Q52 is connected to one terminal of a second ON-time generator capacitor C3, the drain of a MOSFET Q53, and a non-inverting input terminal of a comparator CP3.

An input terminal for the error amplification signal VCOMP is connected to an inverting input terminal of the comparator CP3 and an inverting input terminal of the comparator CP4. The other terminal of the first ON-time generator capacitor C2 is grounded. An output terminal of the comparator CP4 is connected to a reset terminal of an RS flip-flop FF4. An input terminal for the first phase signal Ph1 is connected to the gate of the MOSFET Q54 and a set terminal of the RS flip-flop FF4. The source of the MOSFET Q54 is grounded. An output Q of the RS flip-flop FF4 is connected to an output terminal for the PWM1.

The other terminal of the second ON-time generator capacitor C3 is grounded. An output terminal of the comparator CP3 is connected to a reset terminal of an RS flip-flop FF3. An input terminal for the second phase signal Ph2 is connected to the gate of the MOSFET Q53 and a set terminal of the RS flip-flop FF3. The source of the MOSFET Q53 is grounded. An output Q of the RS flip-flop FF3 is connected to an output terminal for the PWM2.

The comparator CP4, the first ON-time generator capacitor C2, the MOSFET Q54, and the RS flip-flop FF4 form a first ON-time generator circuit. The comparator CP3, the second ON-time generator capacitor C3, the MOSFET Q53, and the RS flip-flop FF3 form a second ON-time generator circuit.

Figure 11:
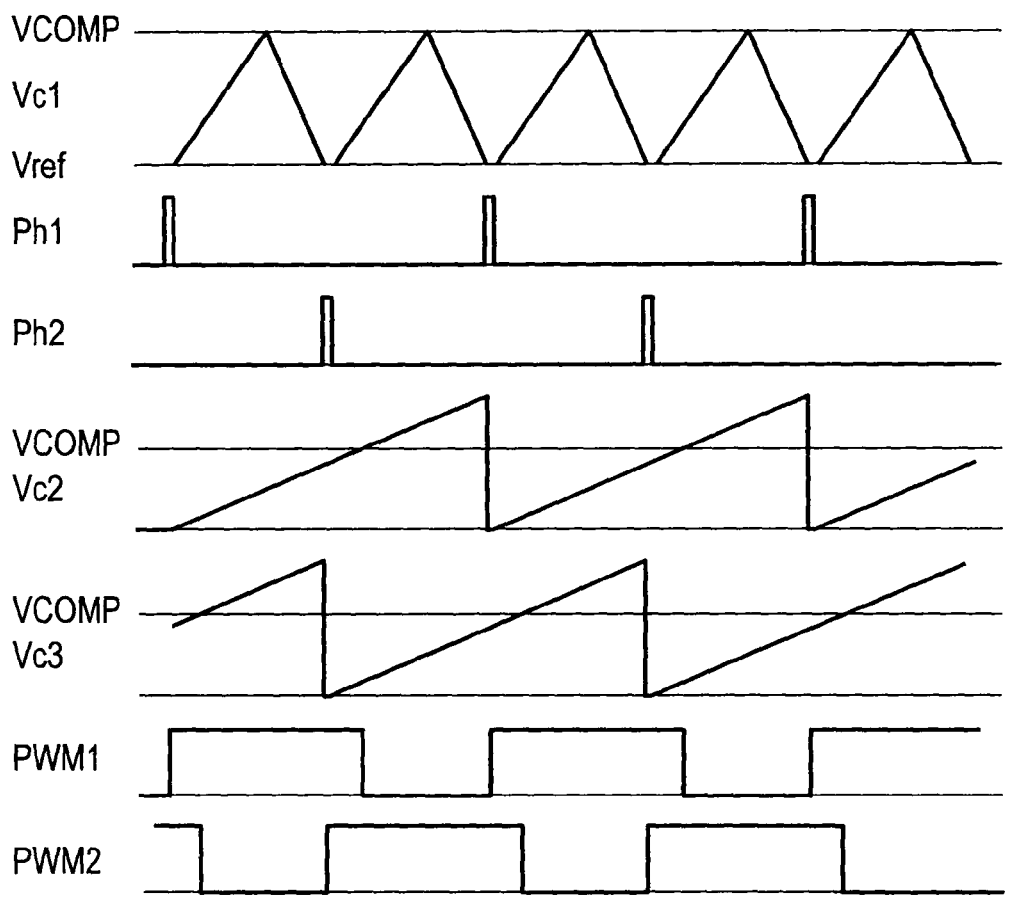
FIG. 11 is a chart showing the operation waveforms of components of the pulse generator shown in FIG. 10.

FIG. 11 is a chart showing the operation waveforms of the respective components of the pulse generator 14 shown in FIG. 10. In FIG. 11, VCOMP represents the error amplification signal VCOMP, Vc1 the voltage across the oscillator capacitor C1, Vref the voltage across the reference power source Vref, Ph1 the first phase signal Ph1, Ph2 the second phase signal Ph2, Vc2 the voltage across the first ON-time generator capacitor C2, Vc3 the voltage across the second ON-time generator capacitor C3, PWM1 the first pulse-train signal, PWM2 the second pulse-train signal.

The ON time signal Ion inputted to the first ON-time generator circuit (or the second ON-time generator circuit) charges the first ON-time generator capacitor C2 (or the second ON-time generator capacitor C3) through the current mirror circuit formed of the transistors Q50, Q51, and Q52. Once the first phase signal Ph1 (or the second phase signal Ph2) is inputted to the first ON-time generator circuit (or the second ON-time generator circuit), the MOSFET Q54 (or the MOSFET Q53) is turned ON, so that the electric charge accumulated in the first ON-time generator capacitor C2 (or the second ON-time generator capacitor C3) is discharged and the RS flip-flop FF4 (or the RS flip-flop FF3) is set.

The first ON-time generator capacitor C2 (or the second ON-time generator capacitor C3) is charged in accordance with the ON time signal Ion. Once the voltages Vc1 and Vc2 are increased to be equal to or higher than the error amplification signal VCOMP, the output of the comparator CP4 (or the comparator CP3) is switched to "H". When the output of the comparator CP4 (or the comparator CP3) is switched to "H", the RS flip-flop FF4 (or the RS flip-flop FF3) is reset.

Even after the RS flip-flop FF4 (or the RS flip-flop FF3) is reset, the first ON-time generator capacitor C2 (or the second ON-time generator capacitor C3) is continuously charged, so that the voltage across the first ON-time generator capacitor C2 (or the second ON-time generator capacitor C3) increases.

Once the first phase signal Ph1 (or the second phase signal Ph2) is inputted, the MOSFET Q54 (or the MOSFET Q53) is turned ON, so that the charge accumulated in the first ON-time generator capacitor C2 (or the second ON-time generator capacitor C3) is discharged and the RS flip-flop FF4 (or the RS flip-flop FF3) is set again. With the above-described operation repeated, the pulse generator 14 generates a pulse train.

On the basis of the pulse trains having mutually different phases which are generated by the pulse generator 14, the drive circuit 15 generates drive signals for driving the switching elements Q1 and Q2, and thereby drives the switching elements Q1 and Q2.

As described so far, since the phase signals are obtained from the result of arithmetic operation on the input voltage, the output voltage, and the error amplification signal, favorable phase signals can be generated even immediately after the start of operation. In addition, a zero current state can be detected with no detecting of currents flowing through the reactors L1 and L2. For this reason, it is possible to suppress, as much as possible, the complicating of a circuit due to an increase in the number of converters connected in parallel without increasing the number of peripheral components such as auxiliary winding. As a result, an inexpensive interleaved converter can be provided.

Embodiment 2

Figure 12:
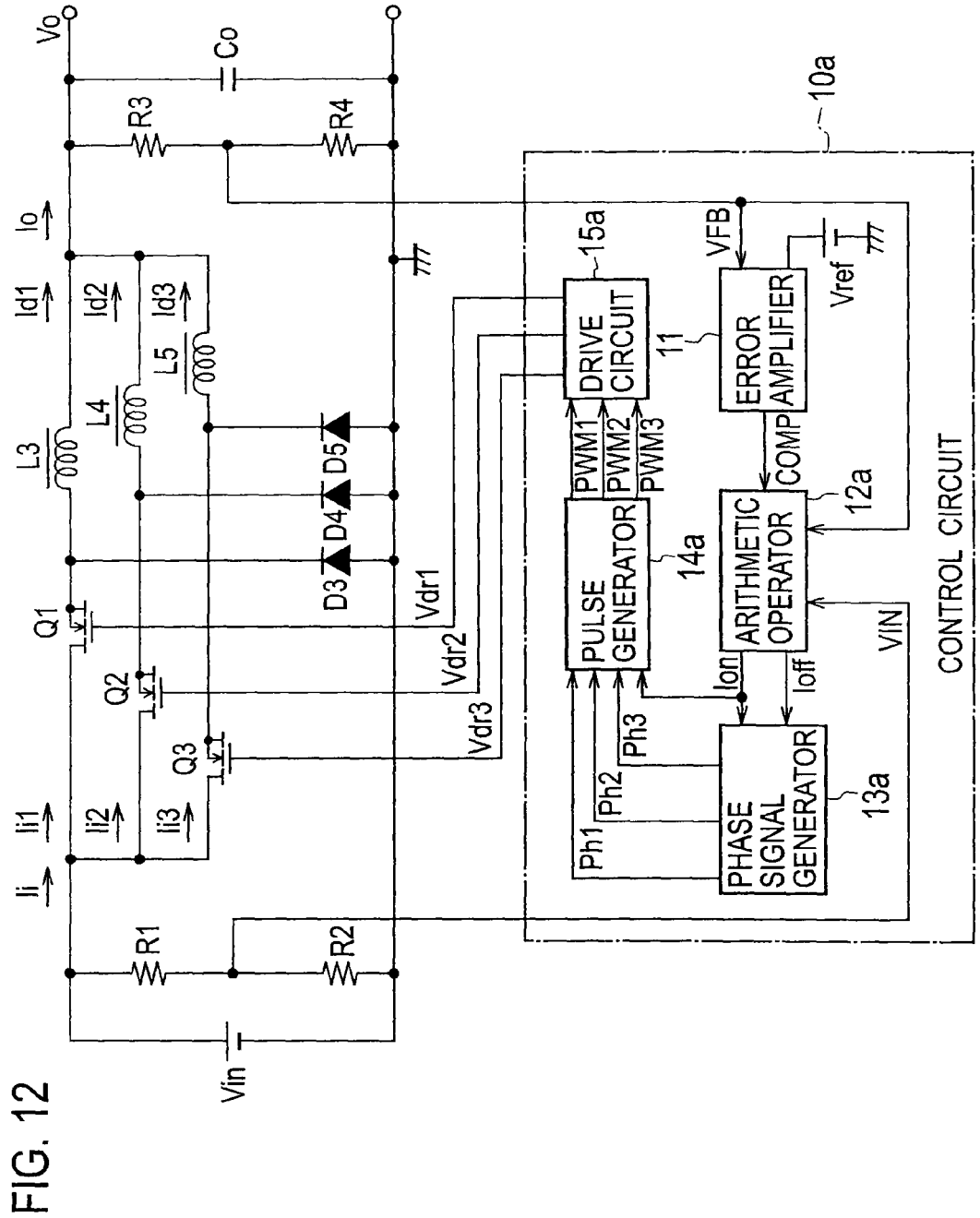
FIG. 12 is a circuit configuration diagram showing an interleaved converter according to Embodiment 2 of the present invention.

FIG. 12 is a circuit configuration diagram showing an interleaved converter according to Embodiment 2 of the present invention. In FIG. 12, a first series circuit, which includes a switching element Q1 made of a MOSFET and a rectifier D3 made of a free-wheeling diode, is connected to both terminals of an input power source Vin formed of a DC power source. A step-down reactor L3 has one terminal connected to the cathode of the rectifier D3 and the other terminal grounded through a smoothing capacitor Co.

A second series circuit, which includes a switching element Q2 made of a MOSFET and a rectifier D4 made of a free-wheeling diode, is connected to both terminals of the input power source Vin. A step-down reactor L4 has one terminal connected to the cathode of the rectifier D4 and the other terminal grounded through the smoothing capacitor Co.

A third series circuit, which includes a switching element Q3 made of a MOSFET and a rectifier D5 made of a free-wheeling diode, is connected to both terminals of the input power source Vin. A step-down reactor L5 has one terminal connected to the cathode of the rectifier D5 and the other terminal grounded through the smoothing capacitor Co.

A first voltage divider resistor formed of a resistor R1 and a resistor R2 is connected to both terminals of the input power source Vin. A second voltage divider resistor formed of a resistor R3 and a resistor R4 is connected to both terminals of the smoothing capacitor Co. A control circuit 10a generates and outputs gate drive signals for the switching elements Q1, Q2, and Q3 based on a midpoint voltage VIN of the first voltage divider resistor and a midpoint voltage VFB of the second voltage divider resistor.

The control circuit 10a includes an error amplifier 11, an arithmetic operator 12a, a phase signal generator 13a, a pulse generator 14a, and a drive circuit 15a. The arithmetic operator 12a is configured to receive the midpoint voltage VIN of the first voltage divider resistor, the midpoint voltage VFB of the second voltage divider resistor, and an error amplification signal VCOMP from the error amplifier 11, and perform arithmetic operation on these voltages. With the output of the arithmetic operation, the arithmetic operator 12a generates and outputs an ON time signal Ion and an OFF time signal Ioff. The ON time signal Ion is a signal proportional to an ON time of the switching elements Q1, Q2, and Q3, and the OFF time signal Ioff is a signal proportional to an OFF time of the switching elements Q1, Q2, and Q3. The phase signal generator 13a is configured to generate and output a first phase signal Ph1, a second phase signal Ph2, and a third phase signal Ph3, based on the ON time signal Ion and the OFF time signal Ioff.

The pulse generator 14a is configured to generate and output a first pulse-train signal PWM1, a second pulse-train signal PWM2, and a third pulse-train signal PWM3 having the same duty ratio and mutually different phases, based on the first phase signal Ph1, the second phase signal Ph2, the third phase signal Ph3, and the ON time signal Ion. The drive circuit 15a is configured to generate and output a first drive signal Vdr1 for driving the switching element Q1, a second drive signal Vdr2 for driving the switching element Q2, and a third drive signal Vdr3 for driving the switching element Q3, based on the first pulse-train signal PWM1, the second pulse-train signal PWM2, and the third pulse-train signal PWM3

The switching element Q1, the rectifier D3, and the step-down reactor L3 form a first converter. The switching element Q2, the rectifier D4, and the step-down reactor L4 form a second converter. The switching element Q3, the rectifier D5, and the step-down reactor L5 form a third converter. The first converter, the second converter, and the third converter are connected to one another at the respective input terminals as well as at the respective output terminals, thereby forming a buck interleaved converter.

The buck converter is configured to output an output voltage Vo that is lower than an input voltage Vin, in accordance with the ON/OFF operations of the switching elements. When the switching element Q1 (or Q2 or Q3) is ON, current flows from Vin, through Q1 (or Q2 or Q3), L3 (or L4 or L5), and Co, to Vin in this order, so that an energy of the magnetic flux is accumulated in the step-down reactor L3 (or L4 or L5) and concurrently electric charge is accumulated in the smoothing capacitor Co.

When the switching element Q1 (or Q2 or Q3) is OFF, current flows from L3 (or L4 or L5), through Co and D3 (or D4 or D5), to L3 (or L4 or L5) in this order, so that the energy of the magnetic flux accumulated in the step-down reactor L3 (or L4 or L5) is released. This operation is expressed by the following expression:

$$\Delta IL = \left| \frac{Vin - Vo}{L} \cdot Ton \right| \le \left| \frac{Vo + VF}{L} \cdot Toff \right|. \quad A(8)$$

In the expression (8), ΔIL represents an amount of change in current flowing through the step-down reactor L3 (or L4 or L5), Vin the voltage across the input power source Vin, Vo the voltage across the smoothing capacitor Co, VF the forward drop voltage of the rectifier D3 (or D4 or D5), L the inductance value of the step-down reactor L3 (or L4 or L5), Ton the ON time of the switching element Q1 (or Q2 or Q3), Toff the OFF time of the switching element Q1 (or Q2 or Q3).

If the OFF time Toff in the expression (8) is obtained, the following expression (9) is obtained:

$$Toff = \frac{Vin - Vo}{Vo + VF} \cdot Ton. \quad A(9)$$

Accordingly, as in the case of Embodiment 1, it is possible to obtain the ON time Ton and the OFF time Toff of the switching elements Q1 to Q3, or the ON time signal Ion proportional to the ON time and the OFF time signal Ioff proportional to the OFF time, by means of the arithmetic operator 12a.

Figure 13:
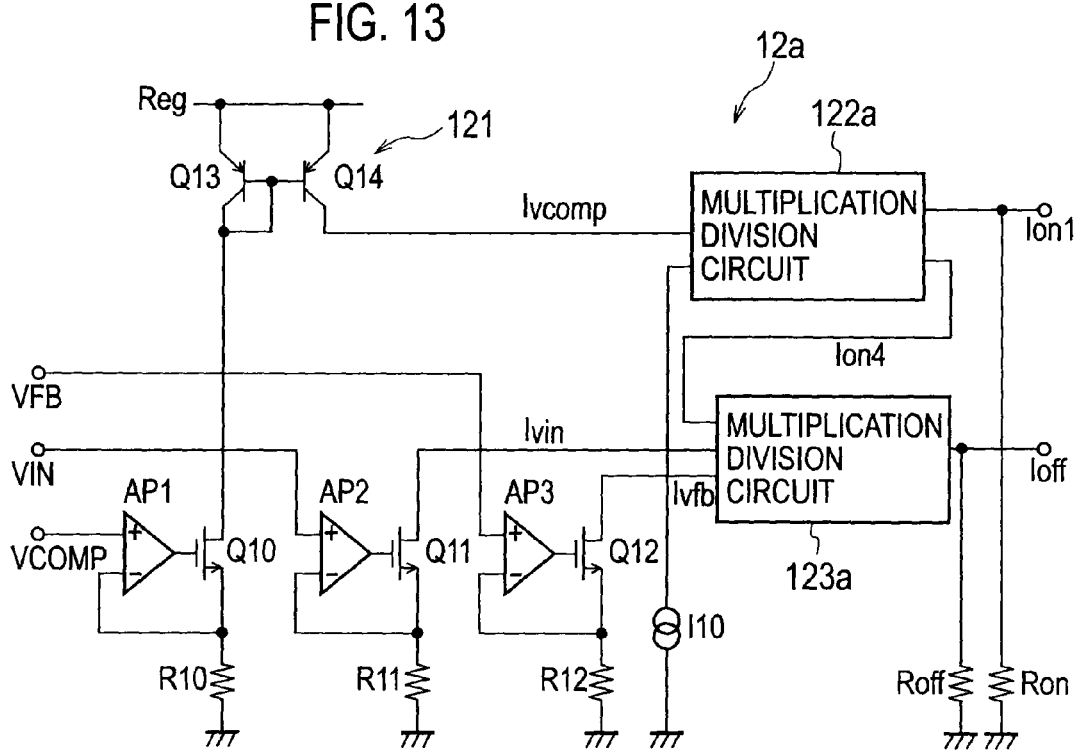
FIG. 13 is a circuit configuration diagram showing an arithmetic operator provided in the interleaved converter according to Embodiment 2.

FIG. 13 is a circuit configuration diagram showing the arithmetic operator 12a provided in the interleaved converter according to Embodiment 2. The arithmetic operator 12a shown in FIG. 13 has a configuration formed by adding a resistor Ron and a resistor Roff to the arithmetic operator 12 shown in FIG. 4. The resistor Ron has one terminal connected to an output terminal for the ON time signal Ion and the other terminal grounded. The resistor Roff has one terminal connected to an output terminal for the OFF time signal Ioff and the other terminal grounded.

The resistor Ron and the resistor Roff are configured to convert current signals into voltage signals for the ON time signal Ion and the OFF time signal Ioff obtained by the arithmetic operation of the arithmetic operator 12a, respectively.

Figure 14:
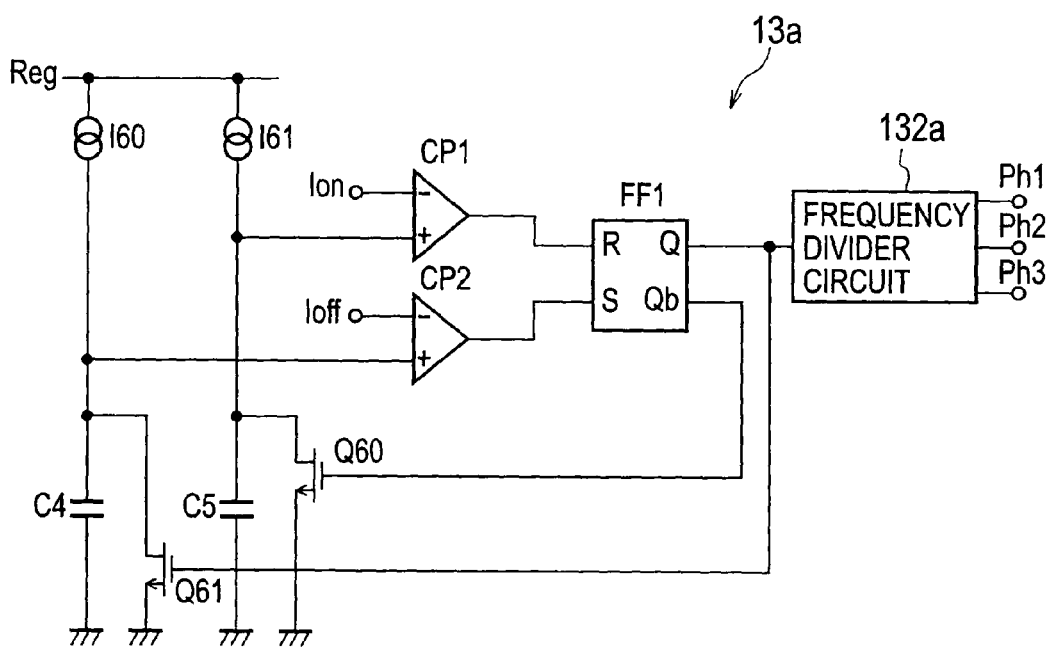
FIG. 14 is a circuit configuration diagram showing a phase signal generator provided in the interleaved converter according to Embodiment 2.

FIG. 14 is a circuit configuration diagram showing the phase signal generator 13a provided in the interleaved converter according to Embodiment 2. In the phase signal generator 13a shown in FIG. 14, a constant current source I61 has one terminal connected to the power source Reg and the other terminal grounded through an oscillator capacitor C5. A comparator CP1 has an inverting input terminal connected to the ON time signal Ion and a non-inverting input terminal connected to a connection point of the constant current source I61 and the oscillator capacitor C5.

A constant current source I60 has one terminal connected to the power source Reg and the other terminal grounded through an oscillator capacitor C4. A comparator CP2 has an inverting input terminal connected to the OFF time signal Ioff and a non-inverting input terminal connected to a connection point of the constant current source I60 and the oscillator capacitor C4. An RS flip-flop FF1 has a set terminal connected to an output terminal of the comparator CP2 and a reset terminal connected to an output terminal of the comparator CP1.

A MOSFET Q60 has the drain connected to a connection point of the constant current source I61 and the oscillator capacitor C5, the source grounded, and the gate connected to an inverted output Qb of the RS flip-flop FF1. A MOSFET Q61 has the drain connected to a connection point of the constant current source I60 and the oscillator capacitor C4, the source grounded, and the gate connected to an output Q of the RS flip-flop FF1. A frequency divider circuit 132a is configured to receive the output Q of the RS flip-flop FF1 and output phase signals Ph1, Ph2, and Ph3.

Figure 15:
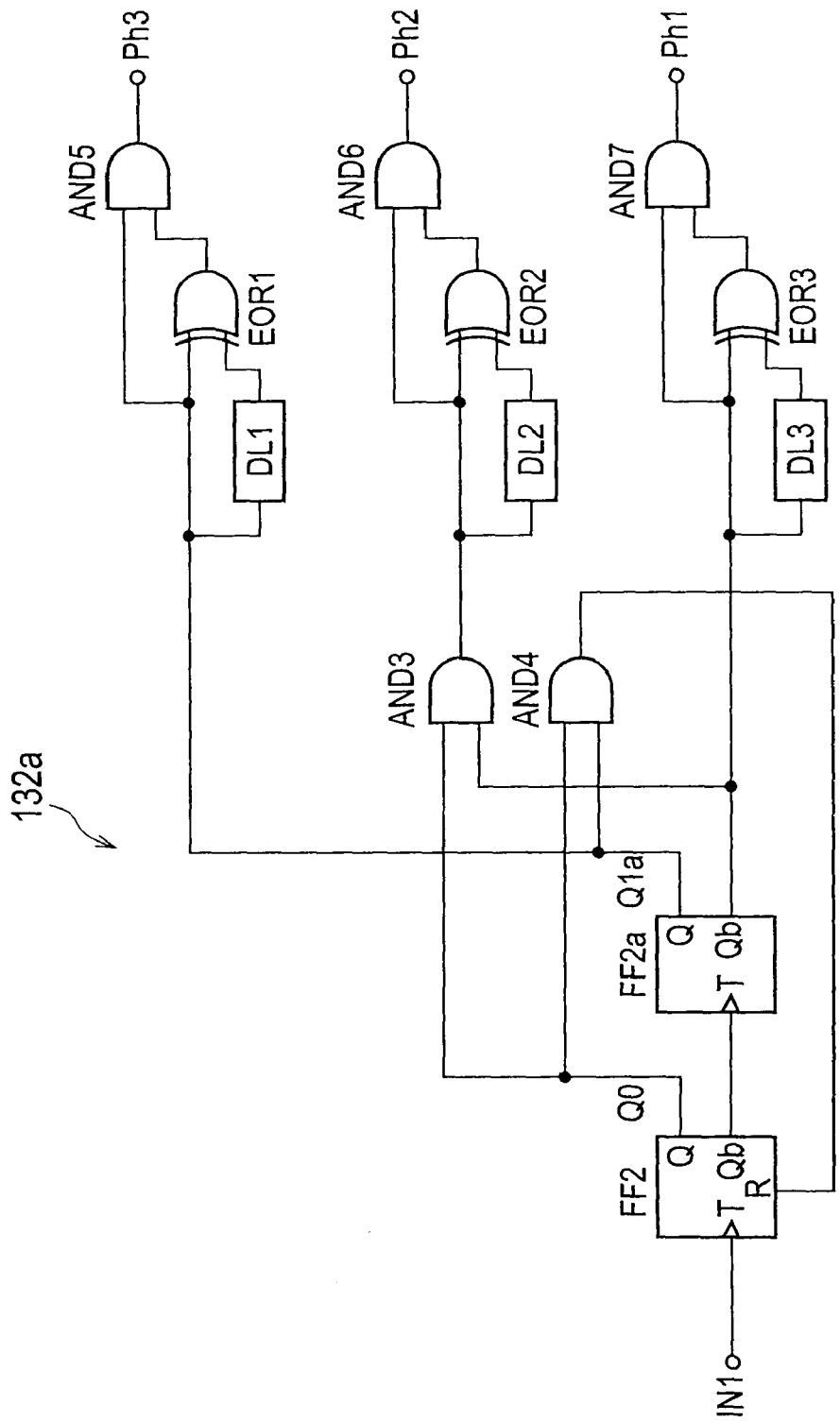
FIG. 15 is a circuit configuration diagram showing a frequency divider circuit in the phase signal generator shown in FIG. 14.

FIG. 15 is a circuit configuration diagram showing the frequency divider circuit 132a in the phase signal generator 13a shown in FIG. 14. In the frequency divider circuit 132a shown in FIG. 15, a T flip-flop FF2 connected to an input terminal IN1, a T flip-flop FF2a, and an AND circuit AND4 form a ternary counter. An output Q0 of the T flip-flop FF2, which corresponds to a least significant bit output of the ternary counter, is connected to an input terminal of an AND circuit AND4 and an input terminal of an AND circuit AND3.

An output Q1a of the T flip-flop FF2a, which corresponds to a most significant bit output of the ternary counter, is connected to the other input terminal of the AND circuit AND4, an input terminal of a delay circuit DL1, an input terminal of an AND circuit AND5, and an input terminal of an exclusive OR circuit EOR1. An output terminal of the delay circuit DL1 is connected to the other input terminal of the exclusive OR circuit EOR1. An output terminal of the exclusive OR circuit EOR1 is connected to the other input terminal of the AND circuit AND5. The third phase signal Ph3 is outputted from an output terminal of the AND circuit AND5.

An output terminal of the AND circuit AND3 is connected to an input terminal of a delay circuit DL2, an input terminal of an AND circuit AND6, and an input terminal of an exclusive OR circuit EOR2. An output terminal of the delay circuit DL2 is connected to the other input terminal of the exclusive OR circuit EOR2. An output terminal of the exclusive OR circuit EOR2 is connected to the other input terminal of the AND circuit AND6. The second phase signal Ph2 is outputted from an output terminal of the AND circuit AND6.

An inverted output Qb of the T flip-flop FF2a, which is an inverted signal of the most significant bit of the ternary counter, is connected to an input terminal of a delay circuit DL3, an input terminal of an AND circuit AND7, and an input terminal of an exclusive OR circuit EOR3. An output terminal of the delay circuit DL3 is connected to the other input terminal of the exclusive OR circuit EOR3. An output terminal of the exclusive OR circuit EOR3 is connected to the other input terminal of the AND circuit AND7. The first phase signal Ph1 is outputted from an output terminal of the AND circuit AND7.

Figure 17:
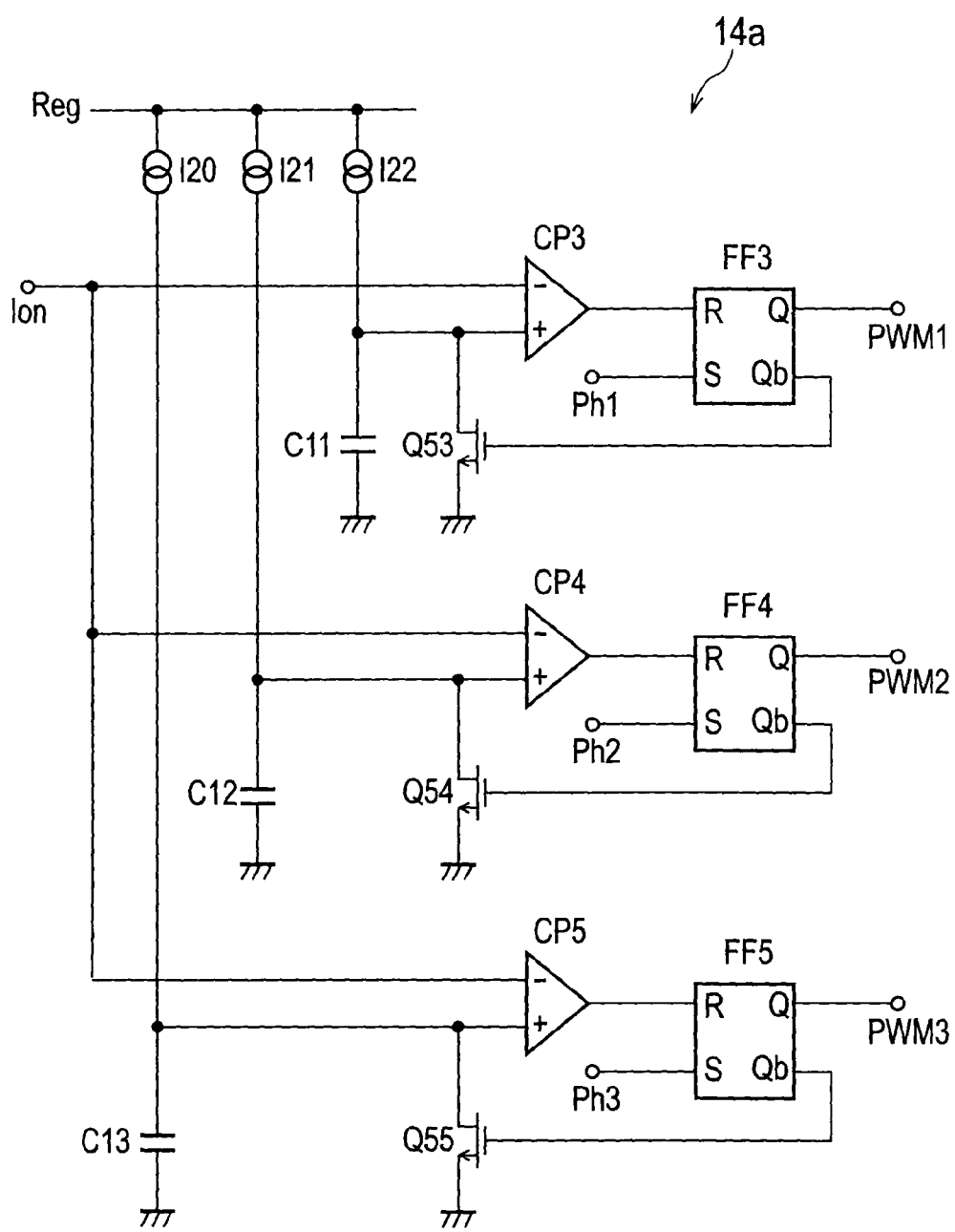
FIG. 17 is a circuit configuration diagram showing a pulse generator provided in the interleaved converter according to Embodiment 2.

FIG. 17 is a circuit configuration diagram showing the pulse generator 14a provided in the interleaved converter according to Embodiment 2. In FIG. 17, an input terminal for the ON time signal Ion is connected to inverting input terminals of comparators CP3, CP4, and CP5. A terminal of each of constant current sources 120, 121, and 122 is connected to the power source Reg.

The other terminal of the constant current source I22 is connected to one terminal of a first ON-time generator capacitor C11, the drain of a MOSFET Q53, and a non-inverting input terminal of the comparator CP3. The other terminal of the first ON-time generator capacitor C11 and the source of the MOSFET Q53 are grounded. The other terminal of the constant current source I21 is connected to one terminal of a second ON-time generator capacitor C12, the drain of a MOSFET Q54, and a non-inverting input terminal of the comparator CP4. The other terminal of the second ON-time generator capacitor C12 and the source of the MOSFET Q54 are grounded. The other terminal of the constant current source I20 is connected to one terminal of a third ON-time generator capacitor C13, the drain of a MOSFET Q55, and a non-inverting input terminal of the comparator CP5. The other terminal of the third ON-time generator capacitor C13 and the source of the MOSFET Q55 are grounded.

An output terminal of the comparator CP3 is connected to a reset terminal of an RS flip-flop FF3. An input terminal for the first phase signal Ph1 is connected to a set terminal of the RS flip-flop FF3. An output Q of the RS flip-flop FF3 is connected to an output terminal for the PWM1. An inverted output Qb of the RS flip-flop FF3 is connected to the gate of the MOSFET Q53.

An output terminal of the comparator CP4 is connected to a reset terminal of an RS flip-flop FF4. An input terminal for the second phase signal Ph2 is connected to a set terminal of the RS flip-flop FF4. An output Q of the RS flip-flop FF4 is connected to an output terminal for the PWM2. An inverted output Qb of the RS flip-flop FF4 is connected to the gate of the MOSFET Q54.

An output terminal of the comparator CP5 is connected to a reset terminal of an RS flip-flop FF5. An input terminal for the third phase signal Ph3 is connected to a set terminal of the RS flip-flop FF5. An output Q of the RS flip-flop FF5 is connected to an output terminal for the PWM3. An inverted output Qb of the RS flip-flop FF5 is connected to the gate of the MOSFET Q55.

The comparator CP3, the first ON-time generator capacitor C11, the MOSFET Q53, and the RS flip-flop FF3 form a first ON-time generator circuit. The comparator CP4, the second ON-time generator capacitor C12, the MOSFET Q54, and the RS flip-flop FF4 form a second ON-time generator circuit. The comparator CP5, the third ON-time generator capacitor C13, the MOSFET Q55, and the RS flip-flop FF5 form a third ON-time generator circuit. The phase signal generator 13a is configured to generate phase signals for controlling three comparators. For this reason, the current values of the constant current sources 160 and 161 are adjusted or each of the oscillator capacitors C4 and C5 is adjusted to have an one-third value so that the frequency of charge/discharge of each of the oscillator capacitors C4 and C5 should be three times as the original oscillation frequency.

Figure 16:
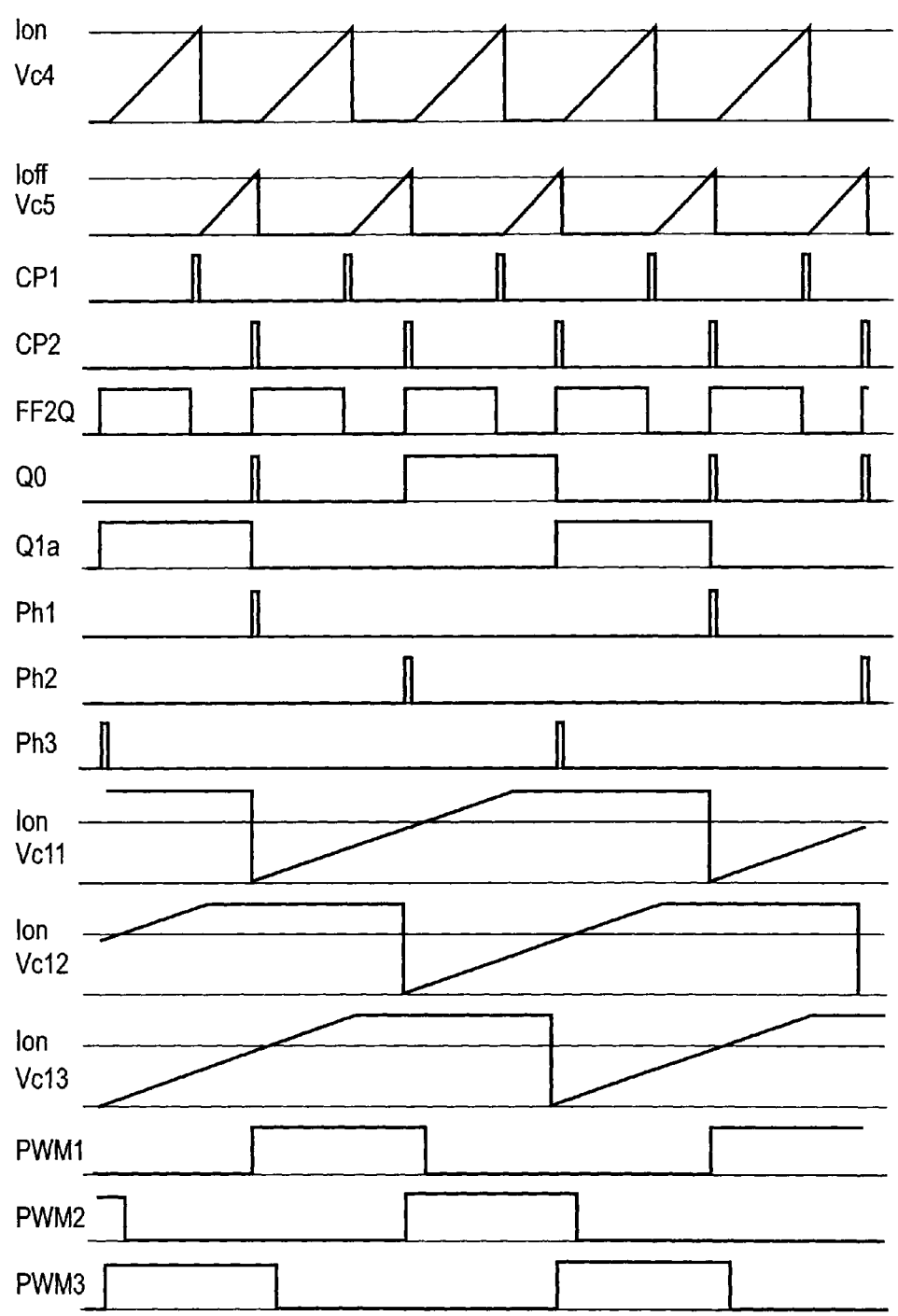
FIG. 16 is a chart showing the operation waveforms of components of the phase signal generator shown in FIG. 14.

FIG. 16 is a chart showing the operation waveforms of the respective components of the phase signal generator 13a. In FIG. 16, Ion represents the ON time signal Ion, Vc4 the voltage across the oscillator capacitor C4, Ioff the OFF time signal Ioff, Vc5 the voltage across the oscillator capacitor C5, CP1 the output signal of the comparator CP1, CP2 the output signal of the comparator CP2, FF2Q the output signal of the RS flip-flop FF2, Q0 the least significant bit output of the ternary counter, Q1a the most significant bit output of the ternary counter, Ph1 the first phase signal, Ph2 the second phase signal, Ph3, the third phase signal, Vc11 the voltage across the first ON-time generator capacitor C11, Vc12 the voltage across the second ON-time generator capacitor C12, Vc13 the voltage across the third ON-time generator capacitor C13, PWM1 the first pulse-train signal, PWM2 the second pulse-train signal, PWM3 the third pulse-train signal.

Next, the operation of the phase signal generator 13a will be described with reference to FIG. 16. First, when the RS flip-flop FF1 is in a set state, the MOSFET Q61 is ON and the MOSFET Q60 is OFF. Since the MOSFET Q61 is ON, the oscillator capacitor C4 is discharged. On the other hand, since the MOSFET Q60 is OFF, the oscillator capacitor C5 is charged by the constant current source I61, so that the voltage across the oscillator capacitor C5 increases.

Once the voltage across the oscillator capacitor C5 is increased to be equal to or higher than the potential of the ON time signal Ion, the output of the comparator CP1 is switched from "L" to "H", so that the RS flip-flop FF1 is reset. When the RS flip-flop FF1 is reset, the MOSFET Q60 is turned ON, so that the oscillator capacitor C5 is discharged and the MOSFET Q61 is turned OFF.

When the MOSFET Q61 is turned OFF, the oscillator capacitor C4 is charged by the constant current source I60. Once the voltage across the oscillator capacitor C4 is increased to be equal to the potential of the OFF time signal Ioff, the comparator CP2 is switched from "L" to "H", so that the RS flip-flop FF1 is set. The above-described operation is repeated, so that a pulse-train signal is outputted from the output terminal of the RS flip-flop FF1. The pulse-train signal varies in the ratio and frequencies of the "H" level and the "L" level depending on the ON time signal Ion and the OFF time signal Ioff, respectively.

When inputted to the frequency divider circuit 132a, the output signal of the RS flip-flop FF1 is divided by 3 by the ternary counter, thereby being converted into a digital signal having the most significant bit Q1a and the least significant bit Q0. The digital signal thus obtained through the conversion is converted into the phase signals Ph1, Ph2, Ph3, having phases mutually shifted by approximately 120 degrees, by the frequency divider circuit 132a formed of the AND circuits AND5 to AND7, the exclusive OR circuits EOR1 to EOR3, and the delay circuits DL1 to DL3.

Each of the phase signals Ph1, Ph2, and Ph3 is inputted to the pulse generator 14a shown in FIG. 17, so that the pulse-train signals PWM1, PWM2, and PWM3 having mutually different phases are generated. The pulse-train signals PWM1, PWM2, and PWM3 are converted respectively into the drive signals Vdr1, Vdr2, and Vdr3 for driving the switching elements Q1 to Q3 by the drive circuit 15a. As a result, the interleaved converter is operated.

As described so far, the interleaved converter according to Embodiment 2 provides the same advantageous effects as those provided by the interleaved converter according to Embodiment 1.

It should be noted that the present invention is not limited to Embodiments 1 and 2 described so far. Although the analogue arithmetic operators are used as the arithmetic operators 12 and 12a in Embodiments 1 and 2, digital arithmetic operators may be used instead. In addition, the converter circuits may be buck boost converters instead of the boost converters and the buck converters. Alternatively, the converter circuits may be forward converters, flyback converters, or resonant converters. Moreover, although the forward step-down voltages of the rectifiers D1 to D5 are omitted in the arithmetic operators 12 and 12a, correction signals may be added in consideration of the forward step-down voltages.

Furthermore, even if the number of converters connected in parallel is increased, the present invention may be adapted by setting the oscillation frequency of each oscillator capacitor as a high frequency suitable for the number of converters and by increasing the number by which the frequency is divided by the frequency divider circuit.

According to the present invention, since the phase signal is obtained from the result of arithmetic operation on the input voltage, the output voltage, and the error amplification signal, favorable phase signals can be generated immediately after the start of operation. In addition, a zero current state can be detected with no detecting of currents flowing through the reactors. For this reason, it is possible to suppress, as much as possible, the complicating of a circuit due to an increase in the number of converters connected in parallel without increasing the number of peripheral components such as auxiliary winding. As a result, an inexpensive interleaved converter can be provided.

The present invention may be employed as a control system for the case where multiple converters are connected in parallel and controlled with mutually shifted phases.

What is claimed is:

1. An interleaved converter comprising:
a parallel converter including a plurality of converters connected in parallel, each of the plurality of converters including a reactor, a switching unit, and a rectifier;
an input power source configured to supply power to the parallel converter;
a smoothing capacitor configured to smooth an output of the parallel converter;
an input voltage detector configured to detect an input voltage of the parallel converter, and thereby to output an input voltage signal;
an output voltage detector configured to detect an output voltage of the parallel converter, and thereby to output an output voltage signal; and
a controller configured to control the parallel converter, wherein
the controller includes:
an error amplifier configured to compare the output voltage signal with a reference voltage, and thereby to output an error amplification signal;
an arithmetic operator configured to perform arithmetic processing based on the input voltage signal, the output voltage signal, and the error amplification signal, and thereby to generate an ON time signal and an OFF time signal;
a phase signal generator configured to generate a plurality of phase signals having mutually different phases, based on the ON time signal, the OFF time signal, and the error amplification signal;
a pulse generator configured to generate a plurality of pulse-train signals synchronized respectively with the plurality of phase signals, based on the ON time signal, the error amplification signal, and the plurality of phase signals; and
a driver configured to drive the switching units in accordance with the plurality of pulse-train signals.

2. The interleaved converter according to claim 1, wherein the phase signal generator includes:
a signal generator configured to generate a signal having a frequency of n times the frequency of a signal generated based on the ON time signal, the OFF time signal, and the error amplification signal; and
a frequency divider configured to divide the signal outputted from the signal generator by n, and thereby to output n phase signals having mutually different phases.

3. The interleaved converter according to claim 1, wherein the arithmetic operator generates the ON time signal based on the error amplification signal, and generates the OFF time signal based on the input voltage signal, the output voltage signal, and the ON time signal.

4. An interleaved converter comprising:
a parallel converter including a plurality of converters connected in parallel, each of the plurality of converters including a reactor, a switching unit, and a rectifier;
an input power source configured to supply power to the parallel converter;
a smoothing capacitor configured to smooth an output of the parallel converter;
an input voltage detector configured to detect an input voltage of the parallel converter, and thereby to output an input voltage signal;
an output voltage detector configured to detect an output voltage of the parallel converter, and thereby to output an output voltage signal; and
a controller configured to control the parallel converter, wherein
the controller includes:
an error amplifier configured to compare the output voltage signal with a reference voltage, and thereby to output an error amplification signal;
an arithmetic operator configured to perform arithmetic processing based on the input voltage signal, the output voltage signal, and the error amplification signal, and thereby to generate an ON time signal and an OFF time signal;
a phase signal generator configured to generate a plurality of phase signals having mutually different phases based on the ON time signal and the OFF time signal;
a pulse generator configured to generate a plurality of pulse-train signals synchronized respectively with the plurality of phase signals, based on the ON time signal and the plurality of phase signals; and
a driver configured to drive the switching units in accordance with the plurality of pulse-train signals.

5. The interleaved converter according to claim 4, wherein the phase signal generator includes:

a signal generator configured to generate a signal having a frequency of n times the frequency of a signal generated based on the ON time signal and the OFF time signal; and a frequency divider configured to divide the signal outputted from the signal generator by n, and thereby to output n phase signals having mutually different phases.

6. The interleaved converter according to claim 4, wherein the arithmetic operator generates the ON time signal based on the error amplification signal, and generates the OFF time signal based on the input voltage signal, the output voltage signal, and the ON time signal.

* * * * *